United States Patent
Tan et al.

(10) Patent No.: US 10,937,416 B2
(45) Date of Patent: Mar. 2, 2021

(54) CROSS-DOMAIN MULTI-TASK LEARNING FOR TEXT CLASSIFICATION

(71) Applicant: International Business Machines Corporation, Armonk, NY (US)

(72) Inventors: Ming Tan, Malden, MA (US); Haoyu Wang, Somerville, MA (US); Ladislav Kunc, Prague (CZ); Yang Yu, Acton, MA (US); Saloni Potdar, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 16/265,740

(22) Filed: Feb. 1, 2019

(65) Prior Publication Data
US 2020/0251100 A1    Aug. 6, 2020

(51) Int. Cl.
*G10L 15/22* (2006.01)
*G10L 15/18* (2013.01)
*G10L 15/16* (2006.01)
*G06N 3/08* (2006.01)
*G06F 40/30* (2020.01)

(52) U.S. Cl.
CPC .......... *G10L 15/1815* (2013.01); *G06F 40/30* (2020.01); *G06N 3/08* (2013.01); *G10L 15/16* (2013.01); *G10L 15/22* (2013.01)

(58) Field of Classification Search
CPC .......... G06N 3/08; G06N 20/00; G06F 40/30
See application file for complete search history.

(56) References Cited

U.S. PATENT DOCUMENTS

| | | | |
|---|---|---|---|
| 7,603,330 B2 | 10/2009 | Gupta et al. | |
| 9,141,916 B1* | 9/2015 | Corrado | G06N 3/08 |
| 9,652,453 B2 | 5/2017 | Mathur et al. | |
| 2010/0100380 A1 | 4/2010 | Tur | |
| 2016/0328388 A1* | 11/2016 | Cao | G06F 40/169 |
| 2016/0350288 A1* | 12/2016 | Wick | G06F 40/242 |
| 2017/0032035 A1 | 2/2017 | Gao et al. | |

(Continued)

OTHER PUBLICATIONS

Bollegala, Danushka, Takanori Maehara, and Ken-ichi Kawarabayashi. "Unsupervised cross-domain word representation learning." arXiv preprint arXiv:1505.07184 (2015). (Year: 2015).*

(Continued)

*Primary Examiner* — Jialong He
(74) *Attorney, Agent, or Firm* — Alexander G. Jochym (57) ABSTRACT

A method includes providing input text to a plurality of multi-task learning (MTL) models corresponding to a plurality of domains. Each MTL model is trained to generate an embedding vector based on the input text. The method further includes providing the input text to a domain identifier that is trained to generate a weight vector based on the input text. The weight vector indicates a classification weight for each domain of the plurality of domains. The method further includes scaling each embedding vector based on a corresponding classification weight of the weight vector to generate a plurality of scaled embedding vectors, generating a feature vector based on the plurality of scaled embedding vectors, and providing the feature vector to an intent classifier that is trained to generate, based on the feature vector, an intent classification result associated with the input text.

20 Claims, 6 Drawing Sheets

(56) References Cited

U.S. PATENT DOCUMENTS

| | | | |
|---|---|---|---|
| 2018/0137855 A1* | 5/2018 | Lee | G10L 15/063 |
| 2018/0373682 A1* | 12/2018 | McCann | G06F 40/47 |
| 2019/0392078 A1* | 12/2019 | Methani | G06F 16/3347 |
| 2020/0050667 A1* | 2/2020 | Lin | G06N 3/084 |

OTHER PUBLICATIONS

Yang et al. "A Simple Regularization-based Algorithm for Learning Cross-Domain Word Ennbeddings", Proceedings of the 2017 Conference on Empirical Methods in Natural Language Processing, pp. 2898-2904. (Year: 2017).*

Crichton, Gamal, et al., "A neural network multi-task learning approach to biomedical named entity recognition", Crichton et al. BMC Bioinformatics (2017) 18:368, DOI 10.1186/s12859-017-1776-8, 14 pages.

Ganin, Yaroslav, et al., "Domain-Adversarial Training of Neural Networks", Journal of Machine Learning Research 17 (2016) 1-35, 2016, 35 pages.

Liu, Pengfei, et al., "Adversarial Multi-task Learning for Text Classification", https://arxiv.org/abs/1704.05742, Accepted by ACL 2017, Apr. 2017.

Liu, Pengfei, et al., "Recurrent Neural Network for Text Classification with Multi-Task Learning", Proceedings of the Twenty-Fifth International Joint Conference on Artificial Intelligence (IJCAI-16), Jul. 2016, 2873-2879.

Luong, Minh-Thang, et al., "Multi-Task Sequence to Sequence Learning", Published as a conference paper at ICLR 2016, 2016, 10 pages.

Niaik, Azad, et al., "Classifying Documents within Multiple Hierarchical Datasets using Multi-Task Learning", 2013 IEEE 25th International Conference on Tools with Artificial Intelligence, 2013, 8 pages.

Subramanian, Sandeep, et al., "Learning General Purpose Distributed Sentence Representations Via Large Scale Multitask Learning", https://arxiv.org/abs/1804.00079, Published as a conference paper at ICLR 2018, 16 pages.

Yu, Mo, et al., "Robust Task Clustering for Deep and Diverse Multi-Task and Few-Shot Learning", https://arxiv.org/abs/1708.07918, Aug. 2017, 15 pages.

* cited by examiner

CROSS-DOMAIN MULTI-TASK LEARNING FOR TEXT CLASSIFICATION

I. BACKGROUND

This disclosure is generally related to cross-domain multi-task learning for text classification.

II. SUMMARY

In a particular example, a computer-implemented method of cross-domain multi-task learning (MTL) for text classification includes obtaining input text and providing the input text to a plurality of MTL models corresponding to a plurality of domains. Each MTL model is trained, based on text samples corresponding to a respective domain of the plurality of domains, to generate an embedding vector based on the input text. The computer-implemented method further includes providing the input text to a domain identifier that is trained, based on the text samples associated with the plurality of domains, to generate a weight vector based on the input text. The weight vector indicates a classification weight for each domain of the plurality of domains, where the classification weight for a particular domain is associated with a probability that the input text is associated with the particular domain. The computer-implemented method further includes scaling each embedding vector based on a corresponding classification weight of the weight vector to generate a plurality of scaled embedding vectors, generating a feature vector based on the plurality of scaled embedding vectors, and providing the feature vector to an intent classifier that is trained to generate, based on the feature vector, an intent classification result associated with the input text.

In another example, an apparatus includes a memory and a processor coupled to the memory. The processor is configured to obtain input text and to provide the input text to a plurality of MTL models corresponding to a plurality of domains. Each MTL model is trained, based on text samples corresponding to a respective domain of the plurality of domains, to generate an embedding vector based on the input text. The processor is further configured to provide the input text to a domain identifier that is trained, based on the text samples associated with the plurality of domains, to generate a weight vector based on the input text. The weight vector indicates a classification weight for each domain of the plurality of domains, where the classification weight for a particular domain is associated with a probability that the input text is associated with the particular domain. The processor is further configured to scale each embedding vector based on a corresponding classification weight of the weight vector to generate a plurality of scaled embedding vectors, to generate a feature vector based on the plurality of scaled embedding vectors, and to provide the feature vector to an intent classifier that is configured to generate, based on the feature vector, an intent classification result associated with the input text.

In another example, a computer-readable medium stores instructions executable by a processor to perform, initiate, or control operations. The operations include obtaining input text and providing the input text to a plurality of MTL models corresponding to a plurality of domains. Each MTL model is trained, based on text samples corresponding to a respective domain of the plurality of domains, to generate an embedding vector based on the input text. The operations further include providing the input text to a domain identifier that is trained, based on the text samples associated with the plurality of domains, to generate a weight vector based on the input text. The weight vector indicates a classification weight for each domain of the plurality of domains, where the classification weight for a particular domain is associated with a probability that the input text is associated with the particular domain. The operations further include scaling each embedding vector based on a corresponding classification weight of the weight vector to generate a plurality of scaled embedding vectors, generating a feature vector based on the plurality of scaled embedding vectors, and providing the feature vector to an intent classifier that is trained to generate, based on the feature vector, an intent classification result associated with the input text.

IV. DETAILED DESCRIPTION

Text classification plays an important role in certain services, such as enterprise-level natural language services that include interactive text response. An interactive text response system can be trained using labeled data (e.g., data that includes labeled examples to train an artificial intelligence system, such as a neural network).

Due to language diversity, data assigned to the same label can share a relatively small amount of lexical information. As a result, effectiveness of classifiers that are based on lexical information from sentences (other than semantic similarity) is reduced.

Some techniques use deep learning training to improve accuracy of text classification. A deep learning approach may involve learning sentence representations by recognizing semantic relations between the examples in the labeled data.

In some cases, deep learning training is inadequate for certain applications. For example, certain commercial systems (e.g., enterprise conversational service systems) may call for low training latency, such as where training sets are edited and tested in real-time or near real-time. As a result, some deep learning training is performed offline.

Offline deep learning training techniques may use different data sets associated with different domains (e.g., different sets of labeled data that feature different training examples). For example, a first data set corresponding to a first domain may be used to train a deep learning model, followed by retraining using a second data set corresponding to a second domain, etc. In some cases, separately training a deep learning model using multiple data sets can reduce training effectiveness and increase training latency. For example, in some circumstances, retraining using the second data set may "undo" certain aspects of training based on the first data set.

In accordance with one aspect of the disclosure, a multi-task learning (MTL) framework uses offline cross-domain training. For example, multiple MTL models may each be trained based on a corresponding domain of multiple domains, and a domain identifier may be trained based on each of the multiple domains. At runtime, each of the multiple MTL models may process input text to generate a respective embedding vector, and the domain identifier may generate a weight vector indicating, for each of the multiple domains, a probability that the input text is associated with the domain. The embedding vectors may be scaled based on the weight vector (e.g., by increasing weight assigned to embedding vectors associated with a greater probability, by reducing weight assigned to embedding vectors associated with a lower probability, or both). As a result, latency associated with training and/or runtime operation may be reduced as compared to deep learning techniques that sequentially train based on multiple domains.

Alternatively or in addition, use of multiple MTL models enables effective processing of a particular data input that includes information associated with multiple domains. As a particular illustrative example, particular input data may have content that semantically "overlaps" domains, such as text having a 90 percent association (or "match") with one domain and a 10 percent association (or match) with another domain. Instead of assigning the input data to a single domain as in certain conventional techniques, processing can be weighted, such as by weighting data associated with one domain with a value of 0.9 and by weighting data associated with another domain with a value of 0.1. As a result, accuracy of certain classification operations is increased by accounting for semantic overlap between domains (e.g., instead of selecting a single domain as a "best match" for input data).

Figure 1A:
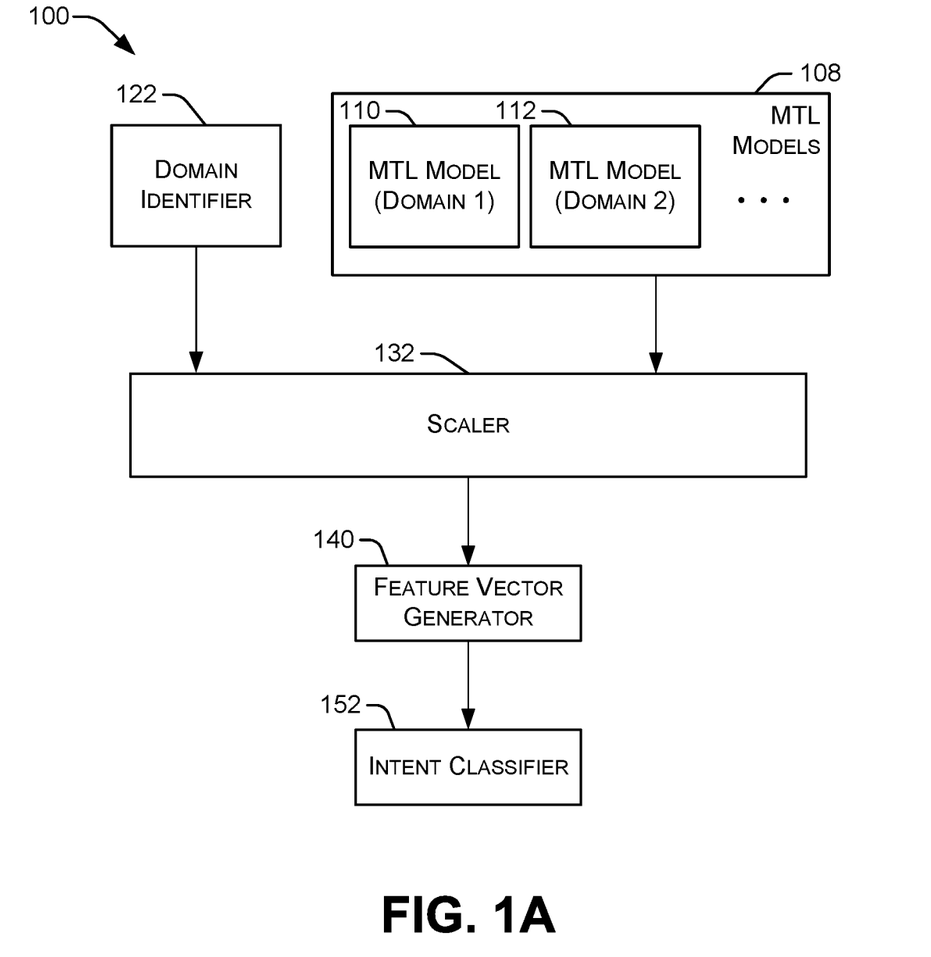
FIG. 1A illustrates a system for cross-domain multi-task learning for text classification according to an example of the disclosure.

FIG. 1A illustrates an example of a system 100 for cross-domain multi-task learning for text classification in accordance with an example of the disclosure. In some implementations, the system 100 corresponds to or is included in an interactive text response system.

In the example of FIG. 1A, the system 100 includes a plurality of multi-task learning (MTL) models 108. To illustrate, in FIG. 1A, the plurality of MTL models 108 includes a first MTL model 110 and a second MTL model 112. In some implementations, the plurality of MTL models 108 includes a different number of MTL models than illustrated in the example of FIG. 1A (e.g., three or more MTL models).

Each MTL model of the plurality of MTL models 108 corresponds to a respective domain of a plurality of domains. To illustrate, the plurality of domains may include different text response applications having different text response characteristics. In some examples, the plurality of domains each are based on different enterprise networks, different business applications, or different business entities. As a particular example, the first MTL model 110 may correspond to a banking domain of the plurality of domains, and the second MTL model 112 may correspond to an insurance domain of the plurality of domains. In this particular example, operation of the first MTL model 110 may differ from operation of the second MTL model 112 due to differences between text associated with banking and text associated with insurance.

In a particular example, the system 100 further includes a domain identifier 122. In some examples, the domain identifier 122 is configured to classify text according to the plurality of domains (e.g., by determining, for each domain of the plurality of domains, a probability that text is associated with the domain).

The example of FIG. 1A also illustrates that the system 100 includes a scaler 132. In one example, the scaler 132 is coupled to the plurality of MTL models 108 and to the domain identifier 122. In a particular example, the system 100 further includes a feature vector generator 140 and an intent classifier 152. In some implementations, the feature vector generator 140 is coupled to the scaler 132, and the intent classifier 152 is coupled to the feature vector generator 140. Depending on the particular implementation, any aspect depicted in FIG. 1A can be implemented using hardware, instructions executed by a processor, or a combination thereof.

By using the plurality of MTL models 108, certain operations can be performed concurrently instead of sequentially. For example, in some implementations, concurrently training the plurality of MTL models 108 based on a plurality of domains reduces training time as compared to sequential training. Further, concurrent training of the plurality of MTL models 108 may reduce or prevent instances of "undoing" (or overriding) training, which may occur in the case of sequentially training a single model.

Alternatively or in addition, in some implementations, the system 100 is configured to process input data that includes information associated with multiple domains. As a particular example, particular input data may include text having a 90 percent association (or "match") with one domain and a 10 percent association (or match) with another domain. Instead of assigning the input data to a single domain as in certain conventional techniques, processing operations by the system 100 can be weighted (e.g., by weighting data associated with one domain with a value of 0.9 and by weighting data associated with another domain with a value of 0.1). For example, outputs generated by the plurality of MTL models 108 can be weighted by the scaler 132 based on weights generated by the domain identifier 122, as described further with reference to FIG. 1B.

Figure 1B:
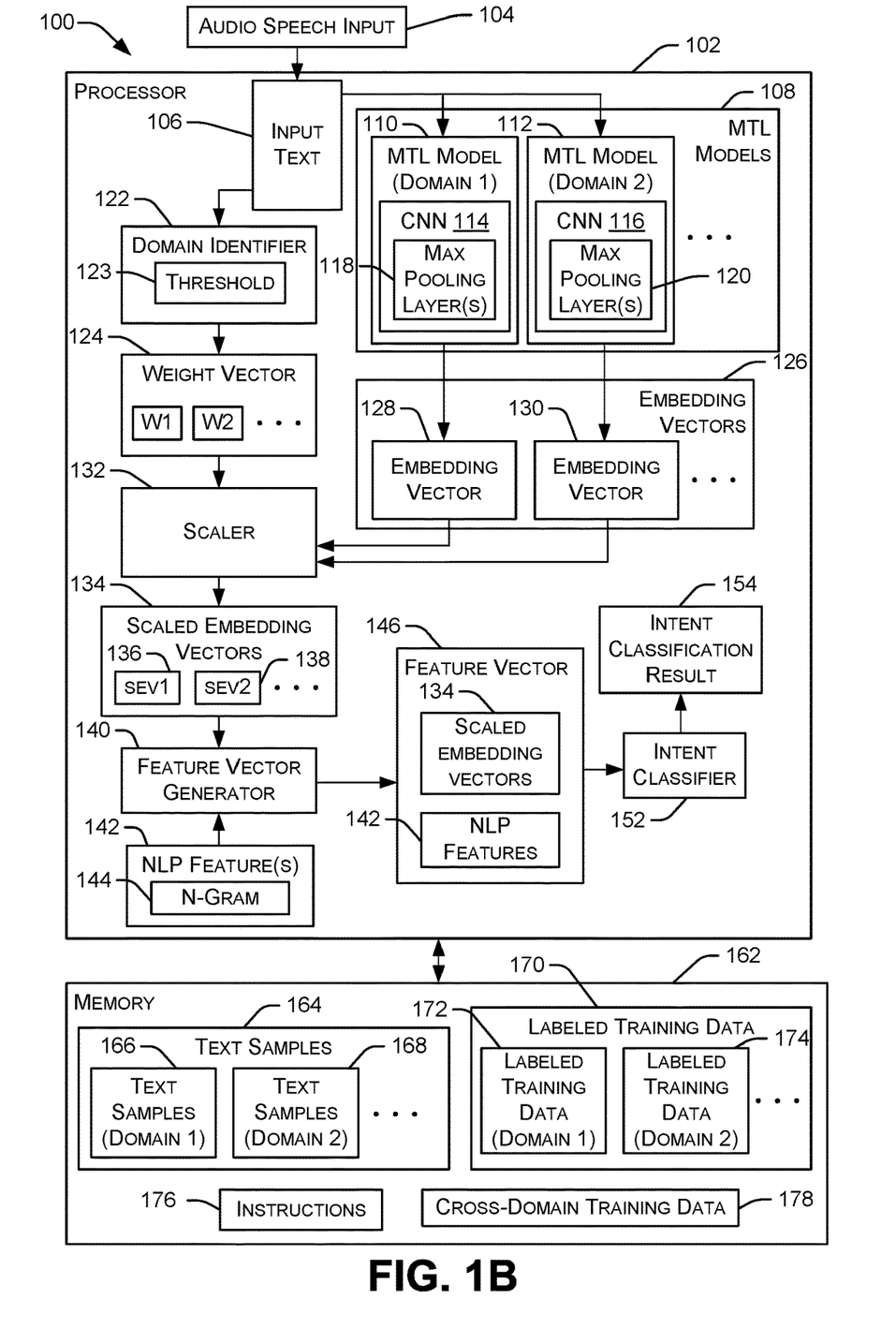
FIG. 1B illustrates another example of a system for cross-domain multi-task learning for text classification according to an example of the disclosure.

Referring to FIG. 1B, a particular example of the system 100 includes a processor 102 and a memory 162 that is coupled to the processor 102. In a particular example, the memory 162 is configured to store instructions 176 that are executable by the processor 102 to initiate, control, or perform operations described herein. In FIG. 1B, certain features described with reference to FIG. 1A are included in (or implemented using) the processor 102.

During operation, a first process (e.g., a training process) may be performed to train certain operations of the processor 102. To illustrate, the training process may include training the plurality of MTL models 108 based on text samples 164 corresponding to the plurality of domains. As a particular example, the text samples 164 may include first text samples 166 corresponding to the first domain associated with the first MTL model 110 and may further include second text samples 168 corresponding to the second domain associated with the second MTL model 112. In this example, the training process may include training the first MTL model 110 based on the first text samples 166 (e.g., by inputting the first text samples 166 to the first MTL model 110) and may further include training the second MTL model 112 based on the second text samples 168 (e.g., by inputting the second text samples 168 to the second MTL model 112). In some examples of the training process, the first MTL model 110 is trained irrespective of the second text samples 168 (e.g., where the second text samples 168 are not provided to the first MTL model 110), and the second MTL model 112 is trained irrespective of the first text samples 166 (e.g., where the first text samples 166 are not provided to the second MTL model 112).

The training process may further include training the domain identifier 122 based on the text samples 164 (e.g., by inputting the text samples 164 to the domain identifier 122). In a particular example, the domain identifier 122 is trained using the first text samples 166 and the second text samples 168.

In some implementations, the plurality of MTL models 108 and the domain identifier 122 are trained further based on labeled training data 170. To illustrate, the first MTL model 110 may be trained (e.g., according to a training process) using first labeled training data 172 associated with the first domain of the plurality of domains, and the second MTL model 112 may be trained using second labeled training data 174 associated with the second domain of the plurality of domains, where the second labeled training data 174 is distinct from the first labeled training data 172. In some examples, the labeled training data 170 includes data that is pre-verified as corresponding to different domains of the plurality of domains.

In one example, the domain identifier 122 is trained using both the first labeled training data 172 and the second labeled training data 174. In another example, the domain identifier 122 is trained using cross-domain training data 178 that is independent of the first labeled training data 172 and the second labeled training data 174.

The training process may further include training the intent classifier 152. In some implementations, training the intent classifier 152 includes configuring the intent classifier 152 to determine (or estimate) intent associated with text or speech (e.g., by determining whether the text or speech includes a command or a question, as an illustrative example).

The processor 102 is configured to obtain input text 106. To illustrate, in one example, the processor 102 is configured to operate based on a runtime mode of operation after completion of the training process. In some examples, the input text 106 corresponds to audio speech input 104. For example, the audio speech input 104 may be recorded (e.g., using a microphone), digitized (e.g., using an analog-to-digital converter), and converted to the input text 106 (e.g., using a speech recognition technique).

The processor 102 is configured to provide the input text 106 to the plurality of MTL models 108. The plurality of MTL models 108 is configured to generate, based on the input text 106, embedding vectors 126. Each embedding vector of the embedding vectors 126 corresponds to a respective domain of the plurality of domains associated with the plurality of MTL models 108. For example, in FIG. 1B, the embedding vectors 126 include a first embedding vector 128 that is associated with the first domain and that is generated by the first MTL model 110. As another example, FIG. 1B also illustrates that the embedding vectors 126 include a second embedding vector 130 that is associated with the second domain and that is generated by the second MTL model 112.

As used herein, an embedding vector may refer to a vector having values that indicate whether certain words, phrases, sentences, or other language features are present (or detected) in the input text 106. Each domain of the plurality of domains may be associated with a particular set of words, phrases, sentences, or other language features. Thus, an embedding vector associated with one domain may differ from an embedding vector associated with another domain (e.g., where the first embedding vector 128 differs from the second embedding vector 130 due to differences in features associated with the first domain and the second domain).

In some examples, each MTL model of the plurality of MTL models 108 includes (or operates according to) a convolutional neural network (CNN). To illustrate, in the example of FIG. 1B, the first MTL model 110 includes a first CNN 114, and the second MTL model 112 includes a second CNN 116. In some implementations, each CNN includes one or more max pooling layers. For example, in FIG. 1B, the first CNN 114 includes one or more max pooling layers 118, and the second CNN 116 includes one or more max pooling layers 120.

To further illustrate, in one example, the first MTL model 110 is configured to generate the first embedding vector 128 by providing the input text 106 as input to an upper convolutional layer of the first CNN 114. The first MTL model 110 may build a max-pooling layer of the one or more max pooling layers 118 on a convolutional output of the first CNN 114 to generate the first embedding vector 128.

The processor 102 is further configured to provide the input text 106 to the domain identifier 122. The domain identifier 122 is configured to generate, based on the input text 106, a weight vector 124. The weight vector 124 includes a classification weight for each domain of the plurality of domains, and the classification weight for a particular domain is associated with a probability that the input text 106 is associated with the particular domain. To illustrate, in FIG. 1B, the weight vector 124 includes a first classification weight W1 indicating a first probability that the input text 106 is associated with the first domain associated with the first MTL model 110. As another example, FIG. 1B also depicts that the weight vector 124 includes a second classification weight W2 indicating a second probability that the input text 106 is associated with the second domain associated with the second MTL model 112. To illustrate, in one example, the domain identifier 122 determines that the input text 106 is more likely to be classified in the first domain (e.g., based on a first number of keywords in the input text 106 that are associated with the first domain) and is less likely to be classified in the second domain (e.g., based on a second number of keywords in the input text 106 that are associated with the second domain, where the second number is less than the first number). In this example, the domain identifier 122 can assign a probability to the first classification weight W1 that is greater than a probability assigned to the second classification weight W2. Alternatively or in addition, the domain identifier 122 can be configured to determine the classification weights W1 and W2 using one or more other techniques, such as using a support vector machine (SVM) technique, a linear regression technique, or a neural network model, as illustrative examples.

In some implementations, domains of the plurality of domains are non-exclusive (e.g., overlapping), and probabilities of the weight vector 124 can add up to more than one. For example, if the first domain overlaps the second domain (e.g., where subject matter is shared by the first domain and the second domain), then the first classification weight W1 and the second classification weight W2 can add up to more than one (e.g., where the classification weights W1, W2 indicate that the input text is likely to correspond to both the first domain and the second domain). In other implementations, domains of the plurality of domains are exclusive (e.g., non-overlapping), and probabilities of the weight vector 124 do not add up to more than one.

In some implementations, the domain identifier 122 is configured to determine each weight of the weight vector 124 based on a threshold 123. For example, the domain identifier 122 may be configured to "round" a weight of the weight vector to a particular probability (e.g., zero or one) based on whether the weight satisfies (e.g., is greater than or equal to) the threshold 123. As an illustrative example, if the threshold corresponds to 0.5 and if the probability that the input text 106 corresponds to the first domain is 0.6, then the domain identifier 122 may be configured to round the first weight W1 up to one to generate a probability of one. As another example, if the probability that the input text 106 corresponds to the second domain is 0.4, then the domain identifier 122 may be configured to round the second weight W2 down to zero to generate a probability of zero.

The processor 102 is configured to scale each embedding vector of the plurality of embedding vectors 126 based on a corresponding classification weight of the weight vector 124 to generate a plurality of scaled embedding vectors 134. In a particular example, the scaler 132 is configured to receive the weight vector 124 and the plurality of embedding vectors 126 and to scale the plurality of embedding vectors 126 based on the weight vector 124 to generate the plurality of scaled embedding vectors 134. For example, in FIG. 1B, the scaler 132 is configured to scale the first embedding vector 128 based on the first classification weight W1 to generate a first scaled embedding vector (SEV) 136. As another example, in FIG. 1B, the scaler 132 is configured to scale the second embedding vector 130 based on the second classification weight W2 to generate a second scaled embedding vector (SEV) 138. In some implementations, scaling an embedding vector includes modifying (e.g., increasing or decreasing) a magnitude of the embedding vector based on a corresponding classification weight (e.g., by increasing the magnitude in response to a greater probability indicated by the classification weight, or by decreasing the magnitude in response to a lower probability indicated by the classification weight). In some examples, scaling the embedding vector 128 accounts for semantic overlap of the input text 106 among multiple domains (e.g., where the input text 106 is a 90 percent match to the first domain and a 10 percent match to the second domain, as an illustrative example).

The processor 102 is configured to generate a feature vector 146 based on the plurality of scaled embedding vectors 134. In a particular example, the feature vector generator 140 is configured to receive the plurality of scaled embedding vectors 134 from the scaler 132 and to generate the feature vector 146 based on the plurality of scaled embedding vectors 134, such as by concatenating the plurality of scaled embedding vectors 134.

In some examples, the processor 102 is further configured to generate one or more natural language processing (NLP) features 142 based on the input text 106, and the feature vector generator 140 is further configured to generate the feature vector 146 by concatenating the plurality of scaled embedding vectors 134 and the one or more NLP features 142. For example, in some implementations, the one or more NLP features 142 include an n-gram 144 associated with the input text 106.

The processor 102 is further configured to provide the feature vector 146 to the intent classifier 152. The intent classifier 152 is configured to generate, based on the feature vector 146, an intent classification result 154 associated with the input text 106. As a particular example, in some implementations, the intent classification result 154 indicates whether the input text includes a command or a question.

In some examples, the intent classification result 154 is provided to a component of an interactive text response system. For example, the intent classification result 154 may be used by the interactive text response system to determine whether the input text 106 indicates that a user is asking a question or giving a command. In some examples, the interactive text response system uses the intent classification result 154 to answer a question indicated by the audio speech input 104 (e.g., by querying a server for data responsive to the question and by providing the data to the user in the form of audio, graphical information, or a combination thereof). Alternatively or in addition, in some examples, the interactive text response system uses the intent classification result 154 to perform an operation responsive to a command indicated by the audio speech input 104 (e.g., by providing a control signal to a particular device, by initiating an Internet communication, or by performing another operation).

Although certain examples are provided for illustration, it is noted that other examples are within the scope of the disclosure. For example, in some implementations, one or both of the MTL models 110, 112 include or operate based on another network (e.g., a recurrent neural network) alternatively or in addition to the CNNs 114, 116 and the max pooling layers 118, 120. Examples of recurrent neural networks include a gated recurrent unit (GRU) neural network or a long short-term memory (LSTM) neural network. To further illustrate, in other examples, the MTL models 110, 112 are configured to perform sentence encoding to generate the embedding vectors 128, 130 using one or more other techniques, such as using a "last hidden vector" technique, as an illustrative example.

One or more aspects of FIGS. 1A and 1B increase efficiency of training and/or runtime operation associated with a text classification system, such as the system 100. For example, by using the plurality of MTL models 108 corresponding to a plurality of domains, certain operations can be performed concurrently instead of sequentially. In some implementations, concurrently training the plurality of MTL models 108 based on a plurality of domains reduces training time as compared to sequential training. Further, concurrent training of the plurality of MTL models 108 may reduce or prevent instances of "undoing" (or overriding) training, which may occur in the case of sequentially training a model.

Alternatively or in addition, in some implementations, the system 100 is configured to process input data that includes information associated with multiple domains. As a particular example, the input text 106 may include text having a 90 percent association (or "match") with one domain and a 10 percent association (or match) with another domain. Instead of assigning the input text 106 to a single domain as in certain conventional techniques, processing operations by the system 100 can be weighted (e.g., by weighting data associated with one domain with a value of 0.9 and by weighting data associated with another domain with a value of 0.1). As a result, accuracy of certain classification operations is increased by accounting for semantic overlap between domains (e.g., instead of selecting a single domain as a "best match" for input data).

Figure 2:
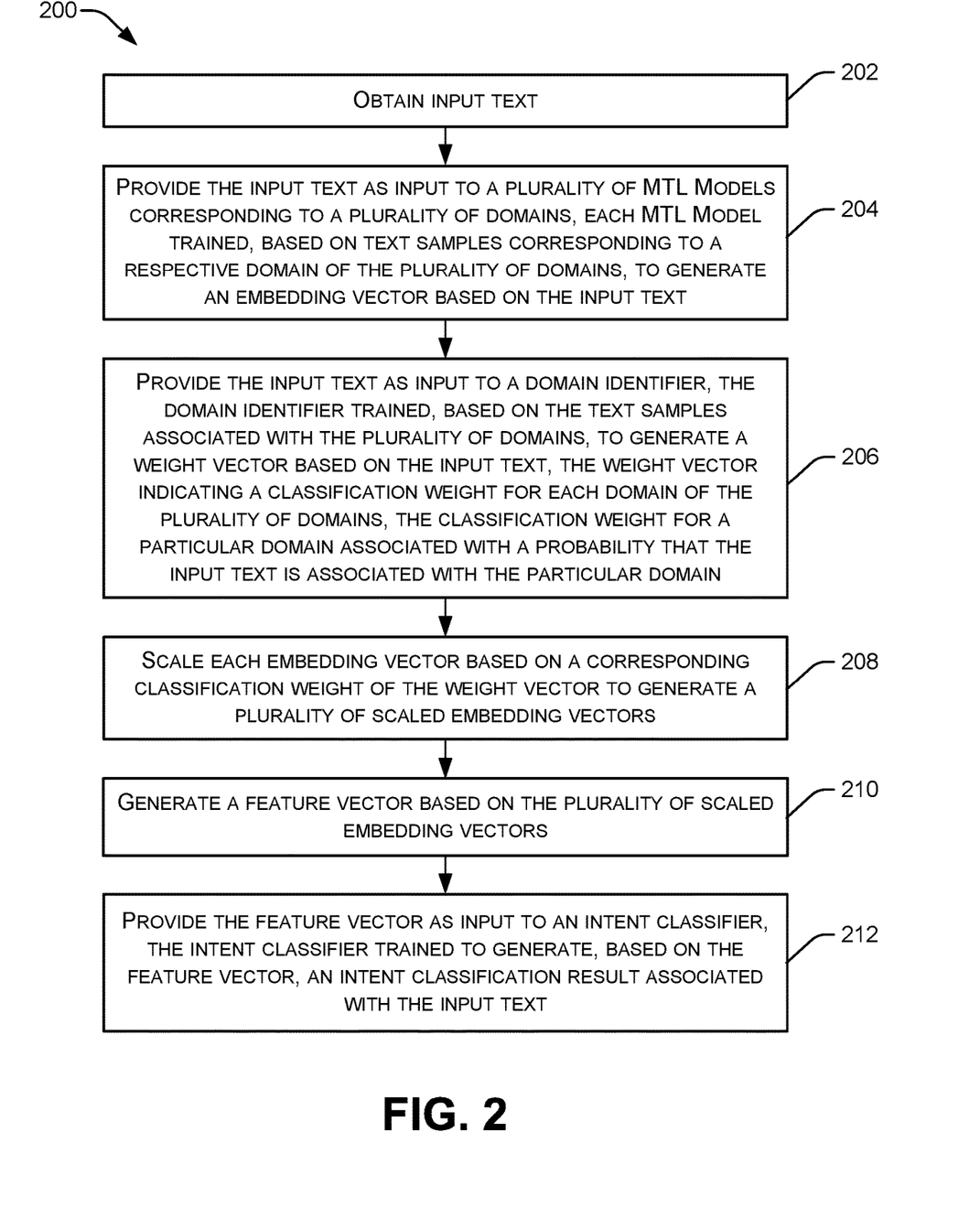
FIG. 2 illustrates a flow chart of a method for cross-domain multi-task learning for text classification according to an example of the disclosure.

Referring to FIG. 2, an example of a computer-implemented method of cross-domain multi-task learning for text classification is depicted and generally designated 200. In a particular example, the method 200 is performed by the processor 102 of FIG. 1B.

The method 200 includes obtaining input text, at 202. For example, the processor 102 may be configured to receive the input text 106.

The method 200 further includes providing the input text to a plurality of MTL models corresponding to a plurality of domains, at 204. Each MTL model is trained, based on text samples corresponding to a respective domain of the plurality of domains, to generate an embedding vector based on the input text. To illustrate, in one example, the input text 106 is provided to the plurality of MTL models 108, and each of the plurality of MTL models 108 is trained, based on respective text samples of the text samples 164, to generate an embedding vector of the plurality of embedding vectors 126.

The method 200 further includes providing the input text to a domain identifier, at 206. The domain identifier is trained, based on the text samples associated with the plurality of domains, to generate a weight vector based on the input text. The weight vector indicates a classification weight for each domain of the plurality of domains, and the classification weight for a particular domain associated with a probability that the input text is associated with the particular domain. To illustrate, in one example, the input text 106 is provided to the domain identifier 122, and the domain identifier 122 is trained, based on the text samples 164, to generate the weight vector 124 based on the input text 106. In some implementations, the domain identifier 122 is trained to determine, for each particular domain of the plurality of domains, the probability that the input text 106 is associated with the particular domain and to generate the weight vector 124 based on whether the probability satisfies the threshold 123 (e.g., by rounding weights of the weight vector 124, as described with reference to FIG. 1B).

The method 200 further includes scaling each embedding vector based on a corresponding classification weight of the weight vector to generate a plurality of scaled embedding vectors, at 208. In one example, the scaler 132 is configured to scale the plurality of embedding vectors 126 based on the weight vector 124 to generate the plurality of scaled embedding vectors 134.

The method 200 further includes generating a feature vector based on the plurality of scaled embedding vectors, at 210. In some implementations, generating the feature vector includes concatenating the plurality of scaled embedding vectors. To illustrate, in one example, the feature vector generator 140 is configured to generate the feature vector 146 based on the plurality of scaled embedding vectors 134 (e.g., by concatenating the plurality of scaled embedding vectors 134). In some examples, the processor 102 is configured to generate the one or more NLP features 142 based on the input text 106, and the feature vector generator 140 is configured to generate the feature vector 146 by concatenating the plurality of scaled embedding vectors and the one or more NLP features 142.

The method 200 further includes providing the feature vector to an intent classifier that is trained to generate, based on the feature vector, an intent classification result associated with the input text, at 212. To illustrate, in some implementations, the intent classifier 152 is configured to receive the feature vector 146 and to generate the intent classification result 154 based on the feature vector 146.

One or more aspects of FIG. 2 improve accuracy or efficiency of a machine learning device. For example, by weighting embedding vectors associated with a plurality of domains, accuracy of intent classification can be improved as compared to intent classification that is based on a single domain.

To further illustrate aspects of the disclosure, certain conventional techniques involve retraining for each new model, increasing training time. In some circumstances, the increased training time results in latency that is unacceptable for certain applications, such as certain applications of a real-time cloud deployed machine learning service. One aspect of the disclosure uses hot-plugging into a faster classification model for each new task, speeding the transfer learning process. In addition, the framework is suitable for multiple conversational workspaces belonging to a semantically similar domain or a specific customer.

In some implementations, the domain identifier 122 includes or corresponds to an independent domain classifier trained by a large-scale corpus. A workspace may be assigned to an MTL model for a specific top-level domain. In some cases, multiple workspaces belong to the same domain. In some cases, data may include multiple significantly different domains.

The domain classifier may assign a "confidence" associated with each domain. The confidence of the domain classifier may be used to rescale the sentence embedding vectors from each domain, resulting in flexibility when the target task subsumes multiple domains.

In one aspect of the disclosure, a domain-specific offline-trained model of multi-task learning for intent short-text classification is enabled by defining a set of top-level domains, by training an independent top-level domain classifier (e.g., the domain identifier 122), and by constructing an MTL model of sentence representation for each top-level domain (e.g., the plurality of embedding vectors 126). During runtime, a confidence distribution (e.g., the weight vector 124) is obtained for the top-level domains and the sentence representation for each domain. The representations of all the domains may be concatenated with the confidences as weights can be used as features for another independent intent classifier (e.g., the intent classifier 152). Thus, a higher dimensional semantic feature vector from domain-level MTL models can be combined with other types of usual text features, such as a bag-of-words n-gram or character-level n-gram features, which may be included in the one or more NLP features 142.

Further, certain aspects of the disclosure enable simpler and faster training of classification models (e.g., a support vector machine (SVM) or logistic regression) for dataset training while also enabling background deep-learning MTL models in a runtime manner to generate sentence representations. Thus, dataset training turn-around is quick and accurate.

For training, a set of top-level domains may be defined, such as telecom, health, sports, politics, finance, etc. A domain classifier may be built using a large amount of training data. For example, documents belonging to each top-level domain may be randomly selected to train the domain classifier. The domain classifier can use a particular machine-learning algorithm. Features and properties may be extracted from the whole training set. In some examples, training data is provided from a particular source (e.g., a business entity) as a set of labeled documents to accurately train the top-level domain classifier.

For each domain, a multi-task learning model can be built in order to determine the sentence representation at runtime. In one example, the domain classifier is operated based on a sampled set of utterances from each training workspace to simplify the training.

An input sentence can be represented by a concatenation of embedding vectors for each word, which can be pre-trained in an unsupervised manner using a large corpus of data in a target language. An upper convolutional layer may receive the word embedding vectors as input, and the model may obtain the sentence representation by building a max-pooling layer on the top of the convolutional output. This model can be shared by all tasks/workspaces with the same top-level domain. The sentence representations can be connected with a regression layer for each workspace to get the final distribution across labels.

Thus, a general knowledge representation may be learned from existing datasets to help improve the accuracy of a new task. In one implementation, offline training includes training a sentence encoder by applying multi-task learning on a large amount of existing classification datasets. Alternatively or in addition, in another implementation, online serving is performed using the sentence encoder by applying multi-task learning on a large amount of existing classification datasets.

In connection with online serving, the sentence encoder may be used to provide extra features to train SVM classifiers (or another machine learning technique) on new datasets. A technical benefit of this transfer learning is natural resolution of knowledge conflicts among datasets while enabling learning of a shared knowledge representation (e.g., via the sentence encoder) from the existing datasets. Another benefit is that the sentence encoder can be hot-plugged for each new classification task without retraining on a new dataset, increasing speed of the transfer learning for a new task.

At runtime, given an input text example S, the domain classifier can be run to obtain domain distributions D(S). The multi-task learning model for each domain $d_k$ can be run to obtain the sentence representations $R_{d_k}(S)$. The concatenated representation vectors $R_{d_k}(S)$ can be combined with the weights $D_k(S)$ for the final feature representation of the sentences as:

$$F_k(S)=\text{Concat}\{D_k(S)R_{d_k}(S)\}, k=1,2 \ldots K.$$

The features can be fed into an independent classifier, such as an SVM. Further, the MTL-based features can be combined with other more traditional text-classification features, such as a unigram, a bigram, a character n-gram, etc.

One or more aspects described herein can be implemented in a cloud computing environment. Although this disclosure includes a description on cloud computing, implementation of the teachings recited herein are not limited to a cloud computing environment. Rather, aspects of the present disclosure are capable of being implemented in conjunction with any other type of computing environment.

Figure 3:
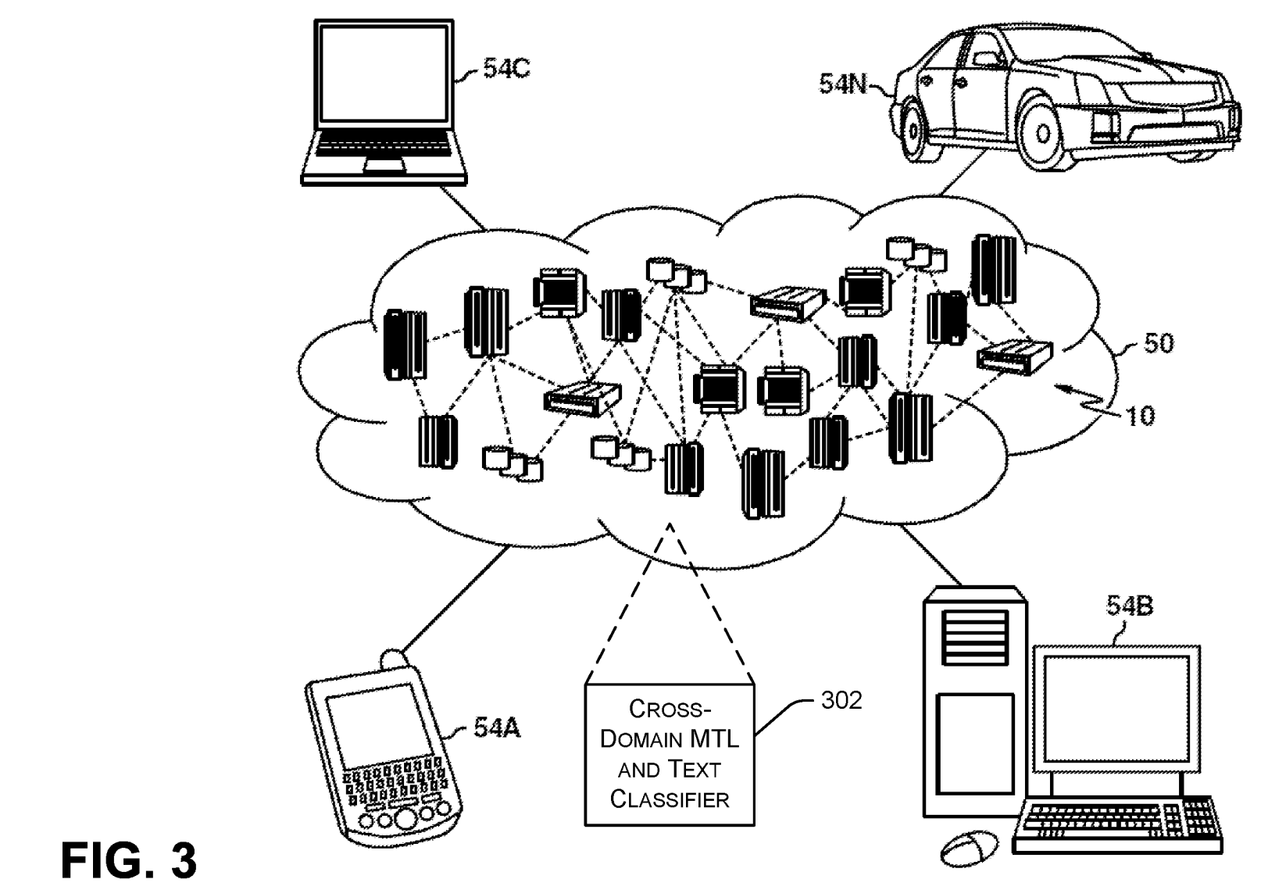
FIG. 3 illustrates a cloud computing environment that includes the system of FIG. 1A or FIG. 1B according to an example of the disclosure.

Referring to FIG. 3, an illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N, may communicate. One or more of the nodes 10 may include a cross-domain MTL and text classifier 302 (e.g., the system 100 of FIG. 1A). Aspects of the cross-domain MTL and text classifier 302 may be implemented using infrastructure, platforms, and/or software provided as services by the cloud computing environment 50.

Nodes 10 may communicate with one another. They may be grouped (not shown) physically or virtually, in one or more networks, such as Private, Community, Public, or Hybrid clouds as described hereinabove, or a combination thereof. This allows the cloud computing environment 50 to offer infrastructure, platforms and/or software as services for which a cloud consumer does not need to maintain resources on a local computing device. The types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
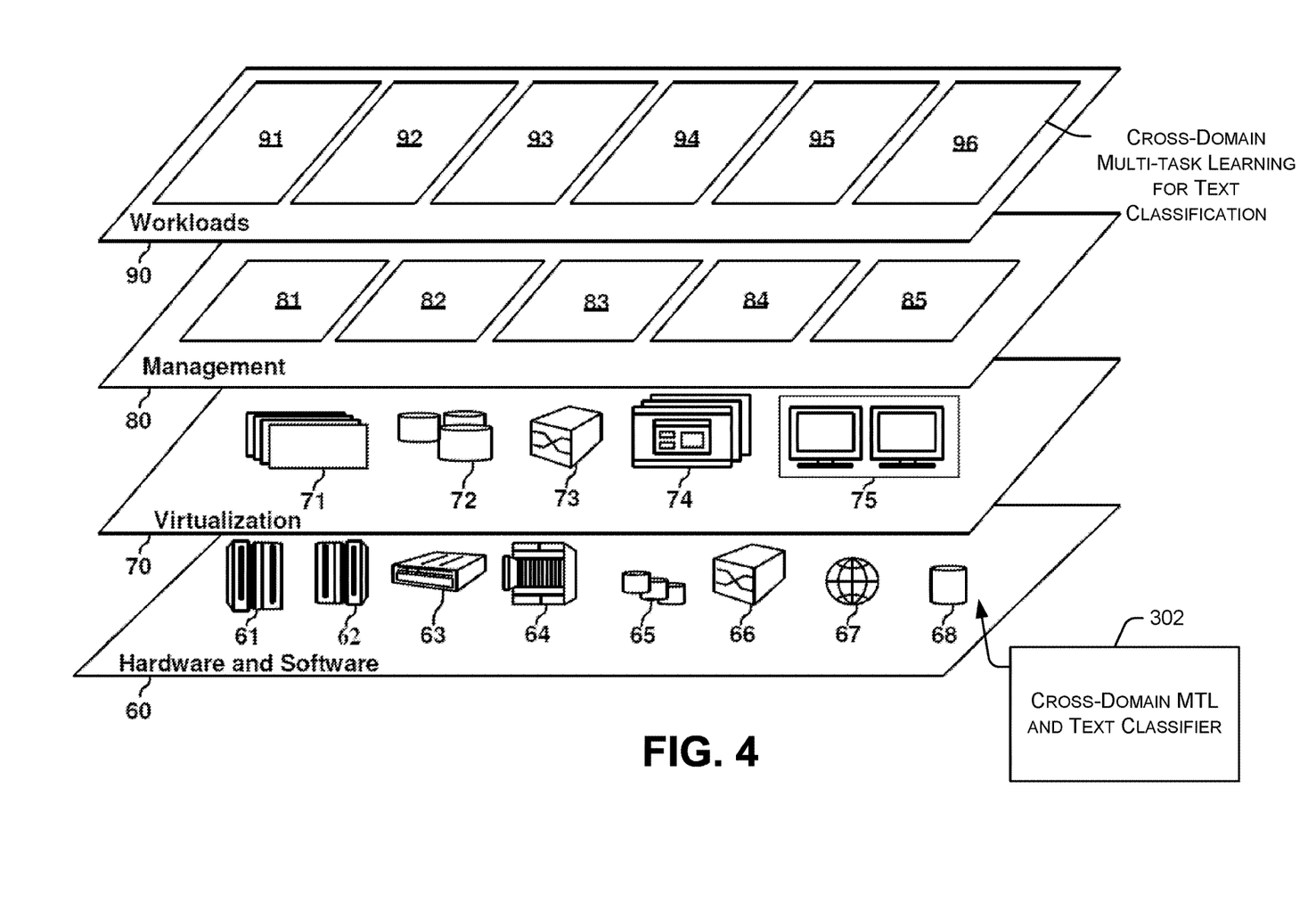
FIG. 4 illustrates abstraction model layers representing an environment that includes the system of FIG. 1A or FIG. 1B according to an example of the disclosure.

Referring to FIG. 4, a set of functional abstraction layers provided by cloud computing environment 50 of FIG. 3 is shown. One or more of the abstraction layers provide cross-domain multi-task learning for text classification of the system 100. It should be understood in advance that the components, layers, and functions shown in FIG. 2 are intended to be illustrative only and aspects of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some aspects, software components include network application server software 67 and database software 68. In some examples, the cross-domain MTL and text classifier 302 of FIG. 3 is included in a device of the hardware and software layer 60.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cross-domain multi-task learning for text classification 96.

Figure 5:
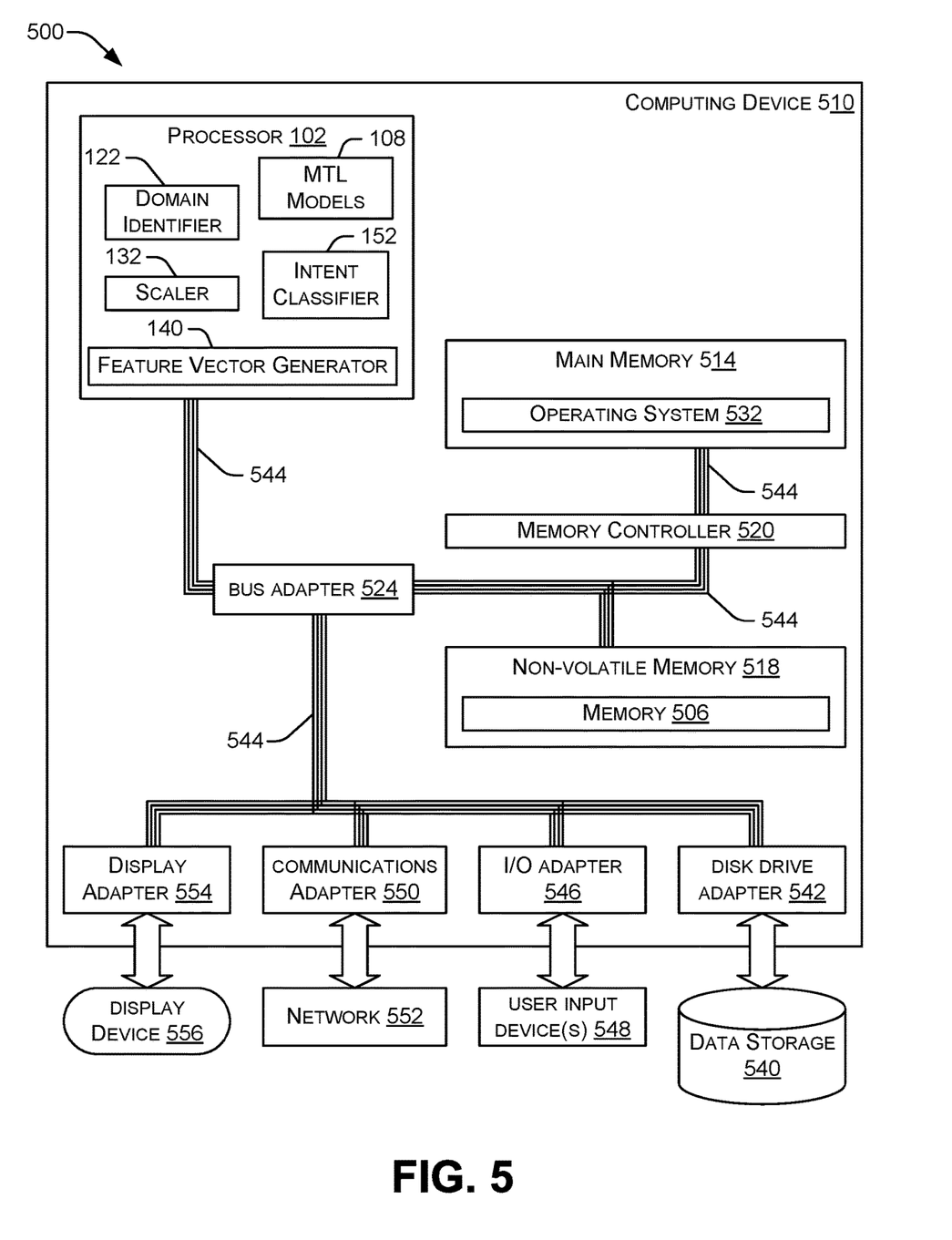
FIG. 5 illustrates a block diagram of a computing environment according to an example of the disclosure that includes electronic components through which cross-domain multi-task learning for text classification may be implemented.

FIG. 5 is a block diagram of an example of a computing environment 500 that includes electronic components through which the described system may be implemented. The components in FIG. 5 support aspects of computer-implemented methods and computer-executable program instructions or code according to the present disclosure. For example, a computing device 510, or portions thereof, may execute instructions to perform cross-domain multi-task learning for text classification.

In FIG. 5, the computing device 510 may include the processor 102 of FIG. 1B, a main memory 514, an input/output (I/O) adapter 546, a non-volatile memory 518, a memory controller 520, a bus adapter 524, a display adapter 554, a communications adapter 550, and a disk drive adapter 542. The I/O adapter 546 may be configured to interface with one or more user input devices 548. For example, the I/O adapter 546 may communicate via serial interfaces (e.g., universal serial bus (USB) interfaces or Institute of Electrical and Electronics Engineers (IEEE) 1394 interfaces), parallel interfaces, display adapters, audio adapters, and other interfaces. The user input devices 548 may include keyboards, pointing devices, displays, speakers, microphones, touch screens, magnetic field generation devices, magnetic field detection devices, and other devices. The processor 102 may detect interaction events based on user input received via the I/O adapter 546. Additionally, the processor 102 may send a graphical user interface (GUI) and related elements to a display device via the I/O adapter 546.

The main memory 514 may include volatile memory devices (e.g., random access memory (RAM) devices), nonvolatile memory devices (e.g., read-only memory (ROM) devices, programmable read-only memory, and flash memory), or both. The main memory 514 of the computing device 510 includes software, such as an operating system 532. The operating system 532 may include a basic/input output system for booting the computing device 510 as well as a full operating system to enable the computing device 510 to interact with users, other programs, and other devices.

The display adapter 554 may be configured to interface with a display device 556. The communications adapter 550 may be configured to interface with the one or more networks 552. The disk drive adapter 542 may be configured to interface with one or more data storage devices 540. The data storage devices 540 may include nonvolatile storage devices, such as magnetic disks, optical disks, or flash memory devices. The data storage devices 540 may include both removable and non-removable memory devices. The data storage devices 540 may be configured to store an operating system, images of operating systems, applications, and program data. One or more buses 544 or other communication circuitry may enable the various components of the computing device 510 to communicate with one another.

The present disclosure may include a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the drawings illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the drawings. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

What is claimed is:

1. A computer-implemented method of cross-domain multi-task learning (MTL) for text classification, the method comprising:
    obtaining input text;
    providing the input text to a plurality of MTL models corresponding to a plurality of domains to generate a plurality of embedding vectors corresponding to each domain of the plurality of domains based on the input text, wherein each MTL model is trained based on text samples corresponding to a respective domain of the plurality of domains;
    providing the input text to a domain identifier, the domain identifier trained, based on the text samples associated with the plurality of domains, to generate a weight vector based on the input text, the weight vector indicating a classification weight for each domain of the plurality of domains, the classification weight for a particular domain associated with a probability that the input text is associated with the particular domain;
    scaling each embedding vector based on a corresponding classification weight of the weight vector to generate a plurality of scaled embedding vectors;
    generating a feature vector based on the plurality of scaled embedding vectors; and
    providing the feature vector to an intent classifier, the intent classifier trained to generate, based on the feature vector, an intent classification result associated with the input text.

2. The computer-implemented method of claim 1, wherein generating the feature vector includes concatenating the plurality of scaled embedding vectors.

3. The computer-implemented method of claim 1, further comprising generating one or more natural language processing (NLP) features based on the input text.

4. The computer-implemented method of claim 3, wherein generating the feature vector includes concatenating the scaled embedding vectors and the one or more NLP features.

5. The computer-implemented method of claim 1, further comprising receiving an audio speech input, wherein the input text is determined based on the audio speech input.

6. The computer-implemented method of claim 1, wherein a first MTL model of the plurality of MTL models is trained using first labeled training data associated with a first domain of the plurality of domains, wherein a second MTL model of the plurality of MTL models is trained using second labeled training data associated with a second domain of the plurality of domains, the second labeled training data distinct from the first labeled training data, and wherein the domain identifier is trained using both the first labeled training data and the second labeled training data.

7. The computer-implemented method of claim 1, wherein a first MTL model of the plurality of MTL models is trained using first labeled training data associated with a first domain of the plurality of domains, wherein a second MTL model of the plurality of MTL models is trained using second labeled training data associated with a second domain of the plurality of domains, the second labeled training data distinct from the first labeled training data, and wherein the domain identifier is trained using cross-domain training data that is independent of the first labeled training data and the second labeled training data.

8. The computer-implemented method of claim 1, wherein the domain identifier is further trained to determine, for each particular domain of the plurality of domains, the probability that the input text is associated with the particular domain and to generate the weight vector based on whether the probability satisfies a threshold.

9. The computer-implemented method of claim 1, wherein each MTL model includes a convolutional neural network with one or more max pooling layers.

10. An apparatus comprising:
    a memory; and
    a processor coupled to the memory and configured to:
        obtain input text;
        provide the input text to a plurality of MTL models corresponding to a plurality of domains to generate a plurality of embedding vectors corresponding to each domain of the plurality of domains based on the input text, wherein each MTL model is trained based on text samples corresponding to a respective domain of the plurality of domains;

provide the input text to a domain identifier, the domain identifier trained, based on the text samples associated with the plurality of domains, to generate a weight vector based on the input text, the weight vector indicating a classification weight for each domain of the plurality of domains, the classification weight for a particular domain associated with a probability that the input text is associated with the particular domain;

scale each embedding vector based on a corresponding classification weight of the weight vector to generate a plurality of scaled embedding vectors;

generate a feature vector based on the plurality of scaled embedding vectors; and provide the feature vector to an intent classifier, the intent classifier configured to generate, based on the feature vector, an intent classification result associated with the input text.

11. The apparatus of claim 10, wherein the processor includes a feature vector generator configured to generate the feature vector by concatenating the plurality of scaled embedding vectors.

12. The apparatus of claim 11, wherein the processor is further configured to generate one or more natural language processing (NLP) features based on the input text.

13. The apparatus of claim 12, wherein the feature vector generator is further configured to generate the feature vector by concatenating the scaled embedding vectors and the one or more NLP features.

14. The apparatus of claim 10, wherein each MTL model includes a convolutional neural network with one or more max pooling layers.

15. A computer-readable storage medium storing instructions executable by a processor to perform, initiate, or control operations, the operations comprising:

obtaining input text;

providing the input text to a plurality of MTL models corresponding to a plurality of domains to generate a plurality of embedding vectors corresponding to each domain of the plurality of domains based on the input text, wherein each MTL model is trained based on text samples corresponding to a respective domain of the plurality of domains;

providing the input text to a domain identifier, the domain identifier trained, based on the text samples associated with the plurality of domains, to generate a weight vector based on the input text, the weight vector indicating a classification weight for each domain of the plurality of domains, the classification weight for a particular domain associated with a probability that the input text is associated with the particular domain;

scaling each embedding vector based on a corresponding classification weight of the weight vector to generate a plurality of scaled embedding vectors;

generating a feature vector based on the plurality of scaled embedding vectors; and providing the feature vector to an intent classifier, the intent classifier trained to generate, based on the feature vector, an intent classification result associated with the input text.

16. The computer-readable storage medium of claim 15, wherein the processor is further configured to determine the input text based on audio speech input.

17. The computer-readable storage medium of claim 15, wherein a first MTL model of the plurality of MTL models is trained using first labeled training data associated with a first domain of the plurality of domains, wherein a second MTL model of the plurality of MTL models is trained using second labeled training data associated with a second domain of the plurality of domains, the second labeled training data distinct from the first labeled training data, and wherein the domain identifier is trained using both the first labeled training data and the second labeled training data.

18. The computer-readable storage medium of claim 15, wherein a first MTL model of the plurality of MTL models is trained using first labeled training data associated with a first domain of the plurality of domains, wherein a second MTL model of the plurality of MTL models is trained using second labeled training data associated with a second domain of the plurality of domains, the second labeled training data distinct from the first labeled training data, and wherein the domain identifier is trained using cross-domain training data that is independent of the first labeled training data and the second labeled training data.

19. The computer-readable storage medium of claim 15, wherein the domain identifier is further trained to determine, for each particular domain of the plurality of domains, the probability that the input text is associated with the particular domain and to generate the weight vector based on whether the probability satisfies a threshold.

20. The computer-readable storage medium of claim 15, wherein each MTL model includes a convolutional neural network with one or more max pooling layers.

* * * * *